July 29, 1924.

J. ANSCHUTZ

BREAD TOASTER

Filed March 10, 1924

1,502,894

John Anschutz,
Inventor

By Clarence A. O'Brien
Attorney

Patented July 29, 1924.

1,502,894

UNITED STATES PATENT OFFICE.

JOHN ANSCHUTZ, OF WASHINGTON, DISTRICT OF COLUMBIA.

BREAD TOASTER.

Application filed March 10, 1924. Serial No. 698,235.

*To all whom it may concern:*

Be it known that I, JOHN ANSCHUTZ, a citizen of the United States, residing at Washington, in the District of Columbia, have invented certain new and useful Improvements in Bread Toasters, of which the following is a specification.

This invention relates to improvements in toasters and has for its principal object to provide a device designed especially for toasting bread, adapted to be used on a cook stove, range, or a gas, oil, or gasoline stove, and is capable of uniformly distributing and spreading the heat so as to prevent the burning or scorching of the bread while the same is in position on the toaster.

A further object of the invention is to provide a bread toaster of the above character, which is of such construction as to enable a number of pieces of bread to be toasted in an efficient manner and whereby the bread will be toasted evenly leaving the same soft and light.

A further object of the invention is to provide a bread toaster of the above mentioned character, wherein a cover is adapted to be removably associated therewith for keeping the toasted bread hot.

Another important object of the invention is to provide a bread toaster of the above mentioned character, which is simple in construction, inexpensive, strong and durable, and further, well adapted for the purposes for which it is designed.

Other objects and advantages of this invention will become apparent during the course of the following description.

Figure 1:
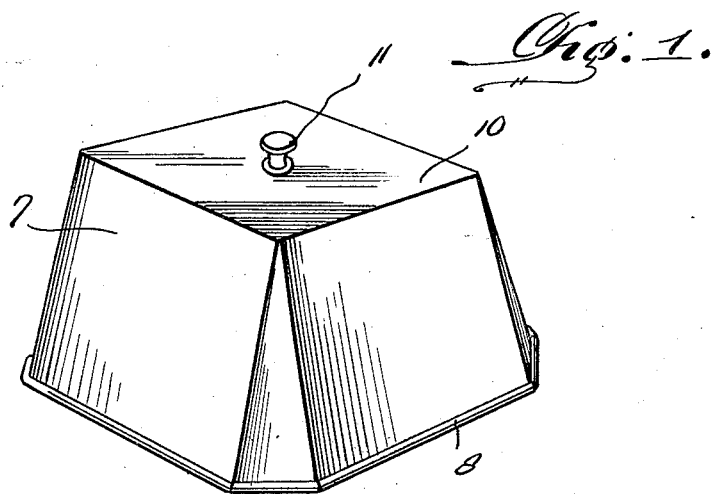
Figure 2:
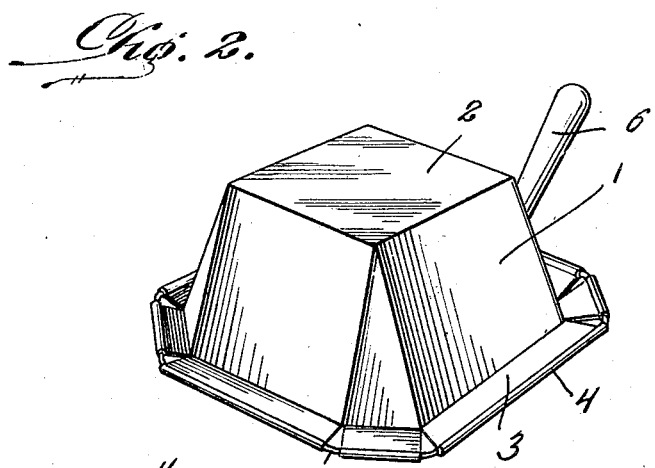
Figure 3:
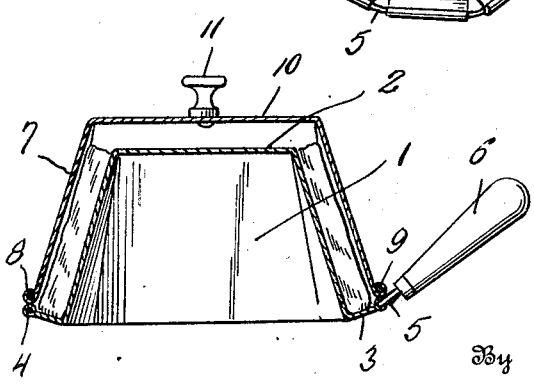

In the accompanying drawing forming a part of this specification, and in which like numerals designate like parts throughout the same, Figure 1 is a perspective view of the cover forming a part of the present invention, Figure 2 is a perspective view of the toaster, and Figure 3 is a vertical section through the toaster showing the same with bread supported thereon and the cover positioned thereon.

In the drawing wherein for the purpose of illustration is shown the preferred embodiment of my invention, the numeral 1 designates generally my improved bread toaster and the same is preferably formed or stamped from sheet metal although it is to be understood that any other suitable material may be substituted therefor.

The bread toaster is substantially frusto-pyramidal shaped as is clearly illustrated in Figure 2 of the drawing. The bottom of the frusto-pyramidal shaped heating body is open and the top thereof is closed as shown at 2 in Figure 3 of the drawing. The sides of the heating body are imperforate as is also the top 2 and the purpose of this construction will be hereinafter more fully described.

Each of the side walls of the frusto-pyramidal shaped heating body 1 has its lower portion bent outwardly to provide the base flange designated generally by the numeral 3. The extreme outer edges of the outwardly bent portions of each of the sides of the pyramidal shaped heating body are curved in the manner as shown to provide the bead 4 and this bead extends around the outer edge of the base flange 3. The base flange 3 may be bent slightly upward in the manner shown in Figure 3 of the drawing so as to extend substantially at right angles to the sides of the pyramidal shaped heating body 1 and the base flange 3 provides a means for supporting the slices of bread against the sides of the bread toaster.

Extending around the base flange 3 and disposed within the bead 4 is the reinforcing wire 5 and the free ends of the wire are adapted to extend outwardly from one of the bead portions to provide a means for receiving the handle 6 whereby the bread toaster may be conveniently handled in placing the same over the flame of the stove when in use or to facilitate the removal thereof from the fire. The handle 6 is preferably formed of wood and it is to be understood that the free ends of the wire 5 are twisted and supported in the handle 6 in any suitable manner such as is well known in the art.

In use, the bread toaster is placed in position over the burner of the stove upon which the same is placed, in such a manner as to have the bottom of the toaster directly over the flame. The slices of bread are then placed on the base flange 3 adjacent the respective sides of the frusto-pyramidal shaped heating body in the manner as shown in Figure 3 of the drawing. The heat passing up into the interior of the heating body 1 will be radiated through the imperforate side walls and will tend to toast the bread in a uniform manner and further in such a manner as to leave the inside of the slices of bread soft and light, thereby avoiding a drying and hardening of the bread as usually results when it is toasted on a toaster wherein the side walls of the same are perforated.

For the purpose of keeping the toasted bread hot, I provide the removable cover designated generally by the numeral 7 which is also substantially frusto-pyramidal shaped and is also formed of substantially the same material as the bread toaster 1. The cover 7 is slightly larger than the bread toaster so as to enable the same to extend completely thereover and the lower edges of the sides of the cover 7 are also curved to provide the bead 8 in which is supported the reinforcing wire 9 and the purpose of this construction is to permit the bead 8 to rest on the bead 4 on the base flange 3 when the cover is in position on the bread toaster in the manner as shown in Figure 3. For the purpose of permitting the cover to be easily handled I provide the top 10 of the cover with a suitable handle 11 arranged centrally therein in a manner as shown in the drawing.

By providing a bread toaster of the above mentioned character, a number of slices of bread may be toasted at one time in an efficient manner and by providing a cover in connection with the toaster, the toasted bread will be kept in a warm condition for a considerable length of time. A bread toaster of the above mentioned character, will not only be inexpensive to manufacture, but will also be strong and durable.

While I have shown the preferred embodiment of my invention, it is to be understood that various changes in the shape, size and arrangement of parts may be resorted to without departing from the spirit of the invention and the scope of the appended claims.

Having thus described my invention, what I claim is:—

1. A bread toaster comprising a substantially frusto-pyramidal shaped heating body formed of imperforate sheet material having its bottom open and its top closed, a flange formed on the bottom of said heating body and extending entirely around the sides thereof to provide a bread support, said flange being disposed at substantially right angles to the sides of the heating body, and a substantially frusto-pyramidal shaped cover formed of imperforate sheet material movably supported on the outer edges of said base flange and extending entirely over the heating body.

2. A bread toaster comprising a substantially frusto-pyramidal shaped heating body formed of imperforate sheet material having its bottom open and its top closed, the lower portions of the sides thereof being bent outwardly to provide a base flange around the bottom of the body and forming a bread support, said flange being disposed at substantially right angles to the sides of the body, a bead formed on the outer edges of said flange, a reinforcing wire supported therein, and a substantially frusto-pyramidal shaped cover formed of imperforate sheet material for said heating body, the lower edges thereof being curved to provide a bead adapted to rest on the bead on said base flange of the heating body, and a reinforcing wire in the bead of said cover.

In testimony whereof I affix my signature.

JOHN ANSCHUTZ.